(12) United States Patent
Ito

(10) Patent No.: US 11,971,142 B2
(45) Date of Patent: Apr. 30, 2024

(54) HYDROGEN SUPPLYING DEVICE AND HYDROGEN ENGINE VEHICLE

(71) Applicant: TOYOTA JIDOSHA KABUSHIKI KAISHA, Aichi-ken (JP)

(72) Inventor: Naoaki Ito, Kariya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/342,735

(22) Filed: Jun. 28, 2023

(65) Prior Publication Data

US 2024/0003494 A1     Jan. 4, 2024

(30) Foreign Application Priority Data

Jul. 4, 2022    (JP) ................ 2022-107547

(51) Int. Cl.
- *F02M 21/02* (2006.01)
- *F02M 21/06* (2006.01)
- *F17C 7/04* (2006.01)

(52) U.S. Cl.
CPC ............ *F17C 7/04* (2013.01); *F02M 21/0209* (2013.01); *F02M 21/0221* (2013.01); *F02M 21/0245* (2013.01); *F02M 21/06* (2013.01); *F02M 21/0239* (2013.01); *F17C 2201/0109* (2013.01); *F17C 2221/012* (2013.01); *F17C 2227/0142* (2013.01); *F17C 2227/0178* (2013.01); *F17C 2227/0323* (2013.01); *F17C 2250/03* (2013.01); *F17C 2250/043* (2013.01); *F17C 2250/0443* (2013.01); *F17C 2250/0636* (2013.01); *F17C 2250/0694* (2013.01); *F17C 2265/066* (2013.01); *F17C 2270/0168* (2013.01)

(58) Field of Classification Search
CPC ......... Y02T 90/40; Y02T 10/12; Y02E 60/32; Y02E 60/34; F02D 19/0644; F02D 19/0663; F02D 19/0684; F02D 41/0027; F02M 25/12; F02M 21/02; F02M 21/0206; F02M 21/06; F17C 2221/012; F17C 2225/0123; F17C 2227/0135; F17C 2227/0302; F17C 2227/0309
See application file for complete search history.

(56) References Cited

U.S. PATENT DOCUMENTS

| | | | |
|---|---|---|---|
| 8,763,565 B2 | 7/2014 | Dunn et al. | |
| 2007/0193275 A1 | 8/2007 | Russo | |
| 2016/0010575 A1* | 1/2016 | Kou ................. | F02D 19/0644 123/3 |

(Continued)

FOREIGN PATENT DOCUMENTS

| | | | | |
|---|---|---|---|---|
| DE | 10160701 A1 * | 6/2003 | ............... | F17C 1/00 |
| DE | 102016220851 A1 | 4/2018 | | |

(Continued)

*Primary Examiner* — George C Jin
*Assistant Examiner* — Teuta B Holbrook
(74) *Attorney, Agent, or Firm* — HAUPTMAN HAM, LLP

(57) ABSTRACT

A hydrogen supplying device includes a liquid hydrogen pump, an evaporator, a pressure chamber configured to be filled with hydrogen gas flowing therein from the evaporator and to supply the filled hydrogen gas to a hydrogen engine, and a pump control unit configured to adjust a discharge flow rate of the liquid hydrogen pump based on both a flow rate of hydrogen to be supplied to the hydrogen engine and an actual pressure in the pressure chamber.

8 Claims, 4 Drawing Sheets

(56) References Cited

U.S. PATENT DOCUMENTS

2022/0118843 A1* 4/2022 Choi .................. B60K 6/32

FOREIGN PATENT DOCUMENTS

| | | | | |
|---|---|---|---|---|
| EP | 1081780 | A2 * | 3/2001 | ............... C01B 3/26 |
| JP | 2004316779 | A * | 11/2004 | |
| JP | 2004316779 | A | 11/2004 | |
| JP | 2006527808 | A | 12/2006 | |
| JP | 2009018950 | A * | 1/2009 | |
| JP | 2009127813 | A * | 6/2009 | |
| JP | 2012526957 | A * | 11/2012 | |
| JP | 2021021433 | A | 2/2021 | |
| KR | 10-2021-0038775 | A | 4/2021 | |

* cited by examiner

HYDROGEN SUPPLYING DEVICE AND HYDROGEN ENGINE VEHICLE

CROSS REFERENCE TO RELATED APPLICATION

This application claims priority to Japanese Patent Application No. 2022-107547 filed on Jul. 4, 2022, which is incorporated herein by reference in its entirety including the specification, claims, drawings, and abstract.

TECHNICAL FIELD

The present disclosure relates to a configuration of a hydrogen supplying device which supplies hydrogen gas to a hydrogen engine and a configuration of a hydrogen engine vehicle equipped with the hydrogen supplying device.

BACKGROUND

JP 2004-316779 A discloses a hydrogen supplying device equipped with a liquid hydrogen tank, a hydrogen pump, an evaporator, and a pressurized hydrogen tank. In the hydrogen supplying device, liquid hydrogen stored in the liquid hydrogen tank is pressurized by the hydrogen pump, and the pressurized liquid hydrogen is evaporated in the evaporator to store hydrogen gas within the pressurized hydrogen tank from which the stored hydrogen gas is supplied to a fuel cell.

JP 2021-21433 A discloses a liquified gas evaporator in which liquid hydrogen is evaporated by a heat exchanger which uses helium gas, and is supplied to a device, such as a gas turbine.

On the other hand, JP 2006-527808 A discloses an engine in which hydrogen gas evaporated by a heat exchanger and air are combusted in a combustion chamber disposed outside a cylinder, and combustion gas is introduced into the cylinder to drive a piston.

In recent years, hydrogen engine vehicles equipped with a hydrogen engine in which hydrogen gas is directly combusted in place of gasoline have been used. In a large number of such hydrogen engine vehicles, high-pressure hydrogen gas stored in a hydrogen gas tank is decompressed, and the decompressed hydrogen gas is supplied to the hydrogen engine. However, there has been a problem in that the capacity of such hydrogen gas tanks is not sufficient to store sufficient hydrogen gas, significantly limiting the distance that may be traveled by the hydrogen engine vehicle without refueling. To circumvent this problem, another method has been studied, in which liquid hydrogen stored in a liquid hydrogen tank which is installed in place of the hydrogen gas tank is evaporated and supplied to a hydrogen engine.

Because the hydrogen engine vehicle is operated only by a driving force of the hydrogen engine, the quantity of hydrogen gas consumed in the hydrogen engine vehicle varies in a range greater than that consumed in a fuel cell vehicle equipped with a fuel cell and a battery for driving. For this reason, there are situations where methods for controlling operation of a hydrogen pump based on pressure in a hydrogen pressure tank using a conventional technique such as that described in JP 2004-316779 A are unable to suppress variations in the pressure of hydrogen gas to be supplied to the hydrogen engine.

Given these circumstances, it is an object of the present disclosure to suppress a pressure variation of hydrogen gas to be supplied to a hydrogen engine.

SUMMARY

A hydrogen supplying device according to an aspect of the present disclosure includes a liquid hydrogen pump configured to pressurize liquid hydrogen stored in a liquid hydrogen tank, an evaporator configured to convert liquid hydrogen discharged from the liquid hydrogen pump into hydrogen gas, a pressure chamber configured to be filled with the hydrogen gas flowing therein from the evaporator and to supply the filled hydrogen gas to a hydrogen engine, and a pump control unit configured to adjust a discharge flow rate of the liquid hydrogen pump, in which the pump control unit is configured to adjust the discharge flow rate of the liquid hydrogen pump, based on both a flow rate of hydrogen to be supplied to the hydrogen engine and an actual pressure in the pressure chamber.

As described above, in the hydrogen supplying device disclosed herein, because the discharge flow rate of the liquid hydrogen pump is adjusted based on both the flow rate of hydrogen to be supplied to the hydrogen engine and the actual pressure in the pressure chamber, pressure variation in the pressure chamber can be suppressed, and a variation in a supply pressure of the hydrogen gas to be supplied to the hydrogen engine can be accordingly reduced, even when the flow rate of hydrogen varies greatly.

In the hydrogen supplying device according to this disclosure, the pump control unit may be configured to adjust the discharge flow rate of the liquid hydrogen pump so as to match the actual pressure in the pressure chamber with a target pressure.

In this way, the hydrogen supplying device disclosed herein becomes able to suppress the pressure variation in the pressure chamber to thereby reduce the variation of the supply pressure of the hydrogen gas to be supplied to the hydrogen engine.

The hydrogen supplying device according to this disclosure may further include a pressure sensor configured to detect the actual pressure in the pressure chamber, in which the pump control unit receives an input from an engine control unit configured to adjust a flow rate of hydrogen to be supplied to the hydrogen engine, the input comprising one or both of a target flow rate of the hydrogen gas to be supplied to the hydrogen engine and an actual flow rate of the hydrogen gas that is detected by a flow rate sensor configured to detect the actual flow rate of hydrogen gas to be supplied to the hydrogen engine, and in which the pump control unit is further configured to adjust the discharge flow rate of the liquid hydrogen pump, based on the one or both of the target flow rate and the actual flow rate of the hydrogen gas and based on the actual pressure in the pressure chamber detected by the pressure sensor.

In the hydrogen supplying devise disclosed herein, because the discharge flow rate of the liquid hydrogen pump is adjusted based on one or both of the target flow rate and the actual flow rate of the hydrogen gas that are input from the engine control unit and also based on the actual pressure in the pressure chamber, adjustment of the discharge flow rate of the liquid hydrogen pump can be performed in a manner linked to operation of the hydrogen engine. In this way, the hydrogen supplying device becomes able to quickly respond to changes in the quantity of hydrogen consumed by the hydrogen engine, and therefore of suppressing the pressure variation in the pressure chamber and accordingly reducing variation of the supply pressure of the hydrogen gas to be supplied to the hydrogen engine.

The hydrogen supplying device according to this disclosure may further include a pressure sensor configured to detect the actual pressure in the pressure chamber and a flow rate sensor configured to detect an actual flow rate of hydrogen gas to be supplied to the hydrogen engine, in which the pump control unit may be configured to adjust the discharge flow rate of the liquid hydrogen pump based on both the actual flow rate of the hydrogen gas detected by the flow rate sensor and the actual pressure in the pressure chamber detected by the pressure sensor.

In this way, even when the target flow rate of the hydrogen gas or the actual flow rate of the hydrogen gas is not input from the engine control unit, the hydrogen supplying device can quickly respond to the change in the quantity of hydrogen consumed by the hydrogen engine, for suppressing the pressure variation in the pressure chamber, and accordingly reducing variations in the supply pressure of the hydrogen gas to be supplied to the hydrogen engine.

In the hydrogen supplying device according to this disclosure, the pressure chamber may have a capacity equivalent to 30 to 60 seconds worth of hydrogen consumed at the maximum flow rate by the hydrogen engine.

In this way, pressure variation in the pressure chamber can be suppressed.

In the hydrogen supplying device according to this disclosure, the evaporator may be a heat exchanger which exchanges heat between liquid hydrogen and helium, and the hydrogen supplying device may further includes a warmer configured to exchange heat between helium and a cooling oil for the hydrogen engine, for warming the helium.

In this way, the liquid hydrogen can be evaporated using of heat from the hydrogen engine, which can improve fuel economy.

A hydrogen engine vehicle according to another aspect of this disclosure includes a hydrogen engine for vehicle driving, and a hydrogen supplying device for supplying hydrogen gas to the hydrogen engine. In the hydrogen engine vehicle, the hydrogen supplying device includes a liquid hydrogen pump configured to increase a pressure of liquid hydrogen stored in a liquid hydrogen tank, an evaporator configured to convert liquid hydrogen discharged from the liquid hydrogen pump into hydrogen gas, a pressure chamber configured to be filled with the hydrogen gas flowing therein from the evaporator and to supply the filled hydrogen gas to the hydrogen engine, and a pump control unit configured to adjust a discharge flow rate of the liquid hydrogen pump, in which the pump control unit is configured to adjust the discharge flow rate of the liquid hydrogen pump, based on both a flow rate of hydrogen to be supplied to the hydrogen engine and an actual pressure in the pressure chamber.

In the hydrogen engine vehicle according to this disclosure, the pump control unit may be configured to adjust the discharge flow rate of the liquid hydrogen pump so as to match the actual pressure in the pressure chamber with a target pressure.

The hydrogen engine vehicle according to this disclosure may further include an engine control unit configured to adjust the flow rate of hydrogen to be supplied to the hydrogen engine, and a flow rate sensor configured to detect an actual flow rate of hydrogen gas to be supplied to the hydrogen engine, in which the hydrogen supplying device may include a pressure sensor configured to detect the actual pressure in the pressure chamber, the pump control unit may be connected to the engine control unit, and is configured to receive an input from the engine control unit, the input including one or both of the target flow rate of the hydrogen gas to be supplied to the hydrogen engine and the actual flow rate of the hydrogen gas, and the pump control unit may be further configured to adjust the discharge flow rate of the liquid hydrogen pump based on the one or both of the target flow rate and the actual flow rate of the hydrogen gas and also based on the actual pressure in the pressure chamber detected by the pressure sensor.

The hydrogen engine vehicle according to this disclosure may include an accelerator and an opening sensor configured to detect an opening of the accelerator, in which the engine control unit may be configured to calculate, based on the opening of the accelerator detected by the opening sensor, the target flow rate of the hydrogen gas to be supplied to the hydrogen engine, and to output the calculated target flow rate to the pump control unit.

According to the present disclosure, variations in the pressure of the hydrogen gas to be supplied to the hydrogen engine can be suppressed.

BRIEF DESCRIPTION OF DRAWINGS

Embodiments of the present disclosure will be described based on the following figures, wherein.

DESCRIPTION OF EMBODIMENTS

Figure 1:
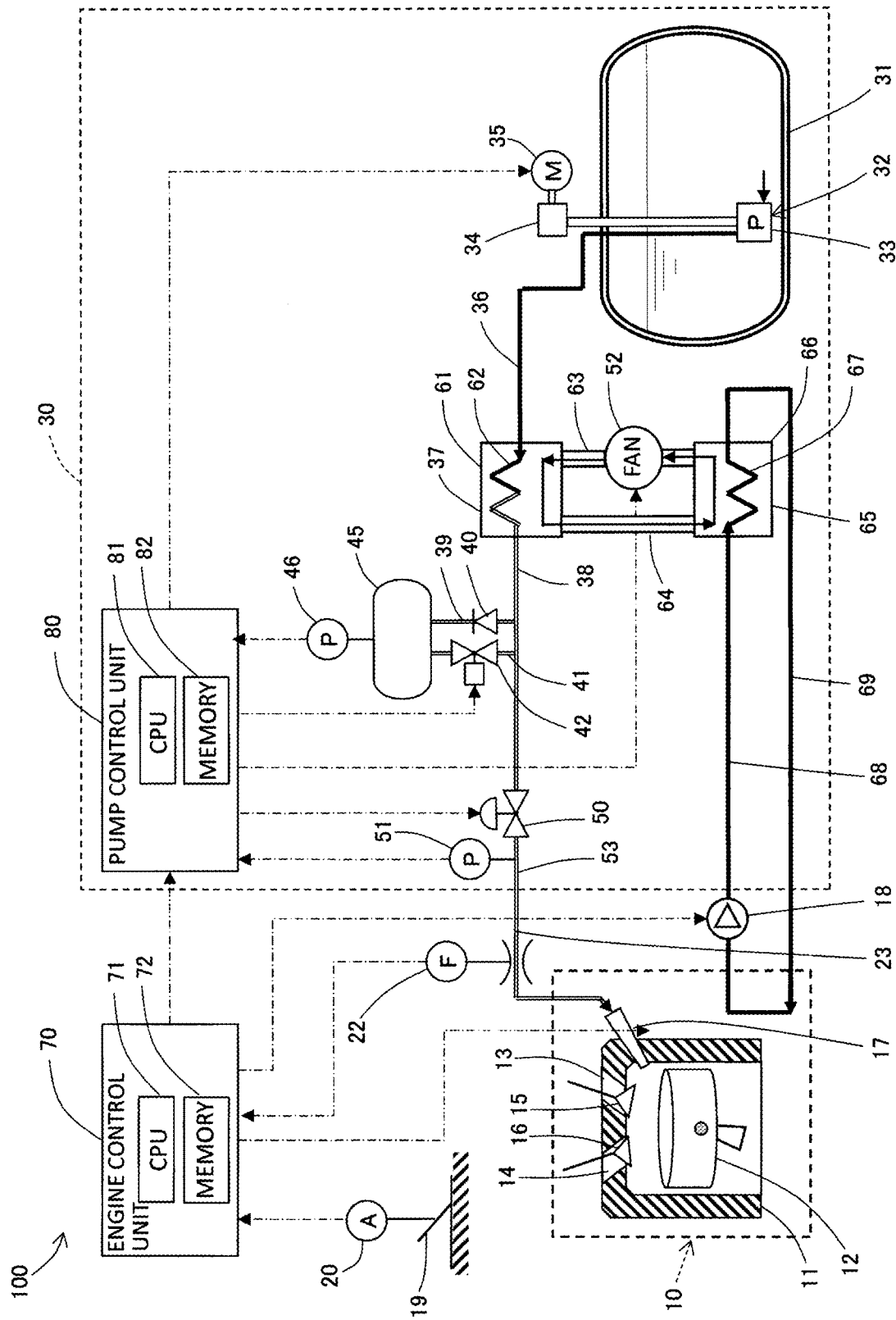
FIG. 1 is a system diagram showing a configuration of a hydrogen engine vehicle according to an embodiment.

Hereinafter, a hydrogen engine vehicle 100 according to an embodiment will be described with reference to the drawings. As shown in FIG. 1, the hydrogen engine vehicle 100 includes a hydrogen engine 10 for vehicle driving, and a hydrogen supplying device 30. It should be noted that in FIGS. 1 and 3, thick solid lines represent a flow channel of a liquid, double lines represent a flow channel of a gas, and dotted dashed lines represent a flow path of signals.

As shown in FIG. 1, the hydrogen engine 10 is a reciprocating internal combustion engine including a plurality of cylinders 11 and pistons 12 moving up and down within the cylinders 11, and has structure the same as that of a gasoline engine. It should be noted that FIG. 1 shows only one of the plurality of cylinders 11. An intake port 13 through which air is introduced into the cylinder 11 and an exhaust port 14 through which a combustion gas is exhausted from the cylinder 11 are arranged in an upper region of the cylinder 11. An intake valve 15 and an exhaust valve 16 are attached to the intake port 13 and the exhaust port 14, respectively. An injector 17 for injecting hydrogen gas into the cylinder 11 is attached to an upper region of a side wall of the cylinder 11. The injector 17 is connected to a hydrogen gas introducing pipe 23 through which hydrogen gas supplied from the hydrogen supplying device 30 is introduced into the injector 17. The hydrogen gas supplied through the hydrogen gas introducing pipe 23 is injected from the injector 17 into the cylinder 11 and combusted therein. The combustion gas moves the piston 12 up and down to thereby rotate a crankshaft (not illustrated in FIG. 1) connected to a lower end of the piston 12.

The hydrogen engine vehicle 100 is equipped with an accelerator 19, an opening sensor 20, a flow rate sensor 22, and an engine control unit 70. The opening sensor 20 is attached to the accelerator 19 to detect an opening thereof, and a signal indicative of the opening detected by the opening sensor 20 is input to the engine control unit 70. The flow rate sensor 22 is attached to the hydrogen gas introducing pipe 23 to detect an actual flow rate of hydrogen gas flowing into the hydrogen engine 10. A signal indicative of the actual flow rate detected by the flow rate sensor 22 is input to the engine control unit 70. In addition, the hydrogen engine vehicle 100 is further equipped with an oil pump 18 for circulating a cooling oil through the hydrogen engine 10. The oil pump 18 is operated by a command from the engine control unit 70.

The engine control unit 70 adjusts a flow rate of hydrogen to be supplied to the hydrogen engine 10. As shown in FIG. 1, the engine control unit 70 is a computer which incorporates a CPU 71 being a processor configured to perform information processing and a memory 72 for storing a program and control data. The engine control unit 70 calculates, based on the opening of the accelerator 19 detected by the opening sensor 20, a target flow rate of the hydrogen gas to be supplied to the hydrogen engine 10, and controls operation of the injector 17 to regulate the flow rate of the hydrogen gas flowing into the hydrogen engine 10. Further, the engine control unit 70 also controls operation of the oil pump 18. The structure of the engine control unit 70 will be described in detail further below.

The hydrogen supplying device 30 increases a pressure of liquid hydrogen stored in a liquid hydrogen tank 31 to evaporate the liquid hydrogen, and supplies the evaporated liquid hydrogen as hydrogen gas at a supply pressure to the hydrogen engine 10. The hydrogen supplying device 30 includes the liquid hydrogen tank 31, a liquid hydrogen pump 32, an evaporator 37, a pressure chamber 45, a pressure reducing valve 50, a warmer 65, and a pump control unit 80.

The liquid hydrogen tank 31 is a container having a heat insulating structure and being configured to store therein cooled liquid hydrogen. An internal pressure of the liquid hydrogen tank 31 is approximately equal to an atmospheric pressure or slightly higher than the atmospheric pressure.

The liquid hydrogen pump 32 is a reciprocating pump which causes an in-tank piston 33 inside the liquid hydrogen tank 31 to vertically reciprocate. The liquid hydrogen pump 32 functions to increase the pressure of the liquid hydrogen stored within the liquid hydrogen tank 31 to a pressure higher than the supply pressure at which the hydrogen gas is supplied to the hydrogen engine 10. A discharge pressure of the liquid hydrogen pump 32 may be approximately twice the supply pressure, for example. A motor 35 and a driving cam 34 for converting rotary motion of the motor 35 into vertically reciprocating motion are arranged outside the liquid hydrogen tank 31. A casing of the in-tank piston 33 has a suction port through which the liquid hydrogen is sucked in and a discharge port from which the liquid hydrogen is discharged, and the discharge port is connected to a liquid hydrogen discharging pipe 36. The liquid hydrogen discharging pipe 36 extends from the inside of the liquid hydrogen tank 31 to the outside thereof and is connected to the evaporator 37. When the motor 35 is rotated, the in-tank piston 33 is vertically reciprocated via the driving cam 34, to pressurize the liquid hydrogen stored in the liquid hydrogen tank 31 and discharge the pressurized liquid hydrogen from the hydrogen discharging pipe 36 into the evaporator 37.

The evaporator 37 is a heat exchanger which exchanges heat between the high-pressure liquid hydrogen discharged from the liquid hydrogen pump 32 and warmed helium gas, and functions to evaporate the liquid hydrogen into hydrogen gas having a high pressure. The evaporator 37 is composed of a casing 61 through which the warmed helium gas flows, and a tube 62 through which the high-pressure liquid hydrogen flows, the tube 62 being attached to an inner region of the casing 61.

The warmer 65 is also a heat exchanger which exchanges heat between the helium gas having passed through the evaporator 37 and the cooling oil for the hydrogen engine 10, and functions to warm the helium gas whose temperature is decreased through the evaporator 37. The warmer 65 is composed of a casing 66 through which the helium gas flows, and a tube 67 through which the cooling oil for the hydrogen engine 10 flows, the tube 67 being attached to an inner region of the casing 66.

The casing 61 of the evaporator 37 is connected to the casing 66 of the warmer 65 via a warmed gas duct 63 and a return duct 64. A fan 52 is attached to the warmed gas duct 63, and is driven to circulate the helium gas through the casing 66 of the warmer 65 and the casing 61 of the evaporator 37. The fan 52 is driven in response to a command from the pump control unit 80 which will be described further below. Meanwhile, the cooling oil for the hydrogen engine 10 is pressurized by the oil pump 18, and is circulated through a supply pipe 68 and a return pipe 69 between the hydrogen engine 10 and the tube 67 in the warmer 65. The oil pump 18 is operated by a command from the engine control unit 70.

The cooling oil for the hydrogen engine 10 that has a high temperature is directed through the tube 67 in the warmer 65 to warm the helium gas. The warmed helium gas is flown through the warmed gas duct 63 into the casing 61 of the evaporator 37, in which heat is exchanged between the warmed helium gas and high-pressure, low-temperature liquid hydrogen flowing into the tube 62 of the evaporator 37 from the liquid hydrogen discharging pipe 36. As a result of the heat exchange, the liquid hydrogen is warmed and evaporated, and accordingly converted into high-pressure hydrogen gas which is flown into a high pressure hydrogen gas supplying pipe 38.

The high pressure hydrogen gas supplying pipe 38 is connected via a hydrogen gas filling pipe 38 and a hydrogen gas discharging pipe 41 to the pressure chamber 45. The hydrogen gas discharging pipe 41 is connected downstream of the hydrogen gas filling pipe 39. A check valve 40 is attached to the hydrogen gas filling pipe 39. In addition, a gate valve 42 is attached to the hydrogen gas discharging pipe 41. A pressure sensor 46 is attached to the pressure chamber 45 to detect an actual pressure in the pressure chamber 45. The pressure chamber 45 has a capacity equivalent to 30 to 60 seconds worth of hydrogen consumed at the maximum flow rate by the hydrogen engine 10. In this way, a pressure variation in the pressure chamber 45 can be suppressed regardless of a change in the quantity of hydrogen consumed by the hydrogen engine 10.

When the pressure of hydrogen gas in the high pressure hydrogen gas supplying pipe 38 is higher than the pressure of hydrogen gas in the pressure chamber 45, the check valve 40 is opened to introduce hydrogen gas from the hydrogen gas filling pipe 39 into the pressure chamber 45. On the other hand, when the pressure of hydrogen gas in the high pressure hydrogen gas supplying pipe 38 is lower than the pressure of hydrogen gas in the pressure chamber 45, the hydrogen gas filled in the pressure chamber 45 flows out through the hydrogen gas discharging pipe 41 and the gate valve 42 into the high pressure hydrogen gas supplying pipe 38. The gate valve 42 is opened and closed in accordance with a command from the pump control unit 80 which will be described further below.

The pressure reducing valve 50 functioning to reduce pressure of the high-pressure hydrogen gas to the supply pressure is installed in the high pressure hydrogen gas supplying pipe 38 downstream of the hydrogen gas discharging pipe 41. The pressure reducing valve 50 is operated in response to a command from the below-described pump control unit 80. The hydrogen gas whose pressure is decreased to the supply pressure by the pressure reducing valve 50 is directed into a hydrogen gas supplying pipe 53 connected to the pressure reducing valve 50 on the downstream side thereof. A pressure sensor 51 for detecting the supply pressure of the hydrogen gas is attached to the hydrogen gas supplying pipe 53. The hydrogen gas supplying pipe 53 is connected to the hydrogen gas introducing pipe 23 through which the hydrogen gas is supplied to the injector 17 in the hydrogen engine 10.

The pump control unit 80 is a computer which incorporates both a CPU 81 being a processor configured to perform information processing, and a memory 82 for storing a program and control data. The pump control unit 80 is connected to the engine control unit 70 and configured to receive an input of date from the engine control unit 70. Further, the pump control unit 80 also receives an input of a signal indicative of the actual pressure in the pressure chamber 45 that is detected by the pressure sensor 46.

The pump control unit 80 adjusts the pressure reducing valve 50 in such a manner that a constant pressure of hydrogen gas will be detected by the pressure sensor 51. Further, the pump control unit 80 controls operation of the fan 52. In addition, the pump control unit 80 regulates the discharge flow rate of the liquid hydrogen pump 32, based on both the flow rate of hydrogen to be supplied to the hydrogen engine 10 and the actual pressure in the pressure chamber 45 detected by the pressure sensor 46.

Figure 2:
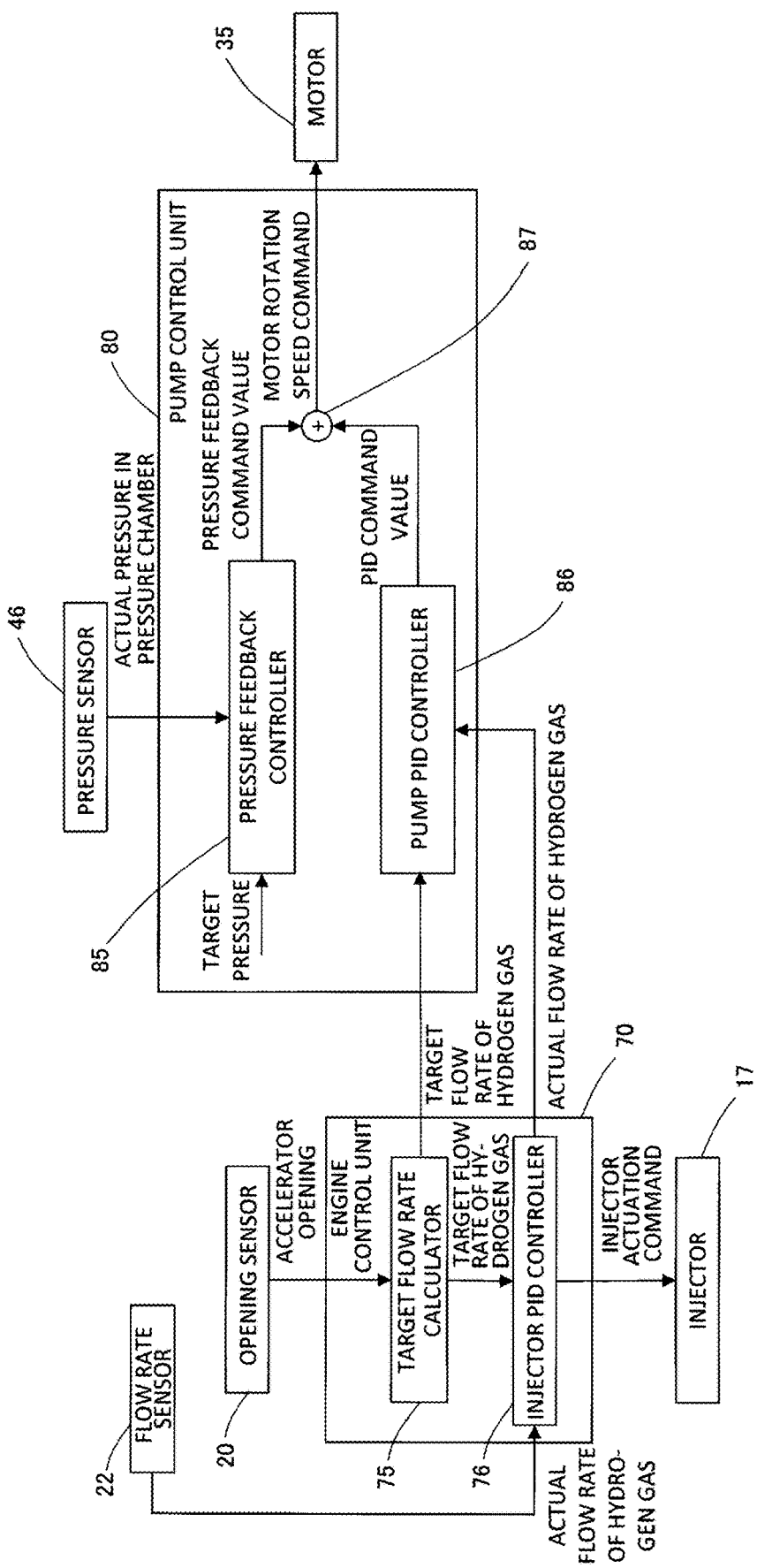
FIG. 2 is a functional block diagram showing an engine control unit and a pump control unit in the hydrogen engine vehicle illustrated in FIG. 1.

Next, the engine control unit 70 and the pump control unit 80 are described in detail with reference to FIG. 2.

The engine control unit 70 includes two functional blocks consisting of a target flow rate calculator 75 and an injector PID controller 76. Each of the functional blocks can be implemented by causing the CPU 71 to execute the program stored in the memory 72.

The target flow rate calculator 75 in the engine control unit 70 calculates, based on the opening of the accelerator 19 that is input from the opening sensor 20, a target flow rate of the hydrogen gas to be supplied to the hydrogen engine 10. For example, the target flow rate may be calculated as a value proportionate to the opening of the accelerator 19, or calculated by referring to a map previously created to show target flow rates in relation to openings of the accelerator 19 and stored in the memory 72. Here, in addition to the opening of the accelerator 19, a velocity of the hydrogen engine vehicle 100 and a rotation speed of the hydrogen engine 10, for example, may be considered in calculating the target flow rate. The target flow rate calculator 75 outputs the calculated target flow rate to both the injector PID controller 76 and a pump PID controller 86 in the pump control unit 80.

The injector PID controller 76 calculates, based on a difference between the target flow rate of the hydrogen gas input by the target flow rate calculator 75 and the actual flow rate of the hydrogen gas detected by the flow rate sensor 22, an actuation command to actuate the injector under PID control and outputs the calculated actuation command to the injector 17. The injector 17 is operated by the actuation command received from the injector PID controller 76. Further, the injector PID controller 76 outputs the actual flow rate of the hydrogen gas input by the flow rate sensor 22 to the pump PID controller 86 in the pump control unit 80.

The pump control unit 80 includes three functional blocks consisting of a pressure feedback controller 85, the pump PID controller 86, and an adder 87. Each of the functional blocks is implemented by causing the CPU 81 to execute a program stored in the memory 82.

A requirement for the hydrogen supplying device 30 is to generate hydrogen gas at a flow rate equal to the actual flow rate of hydrogen gas consumed by the hydrogen engine 10. Because the quantity of hydrogen gas generated is proportional to a flow rate of liquid hydrogen discharged from the liquid hydrogen pump 32, the above requirement for the hydrogen supplying device 30 can be fulfilled by controlling the liquid hydrogen pump 32 to discharge liquid hydrogen at a flow rate proportionate to the actual flow rate of the hydrogen gas consumed by the hydrogen engine 10. However, when the flow rate of hydrogen gas generated in the hydrogen supplying device 30 is lower than the flow rate of hydrogen gas consumed by the hydrogen engine 10, the actual pressure in the pressure chamber 45 is decreased. On the other hand, when the flow rate of hydrogen gas generated in the hydrogen supplying device 30 is higher than the flow rate of hydrogen gas consumed by the hydrogen engine 10, the actual pressure in the pressure chamber 45 is increased. A variation of the actual pressure in the pressure chamber 45 causes a variation of the supply pressure of hydrogen gas downstream of the pressure reducing valve 50. Further, when the actual pressure in the pressure chamber 45 becomes lower than the supply pressure, it is impossible to supply hydrogen gas to the hydrogen engine 10.

To avoid such a situation, the pump control unit 80 causes the pump PID controller 86 to calculate a PID command value for adjusting the rotation speed of the motor 35 of the liquid hydrogen pump 32 so as to match the flow rate of liquid hydrogen discharged from the liquid hydrogen pump 32 with the flow rate of hydrogen gas to be supplied to the hydrogen engine 10. The pump control unit 80 also causes the pressure feedback controller 85 to calculate a pressure feedback command value for adjusting the rotation speed of the motor 35 of the liquid hydrogen pump 32 so as to suppress variation of the actual pressure in the pressure chamber 45. Then, the pump control unit 80 causes the adder 87 to add the PID command value and the pressure feedback command value to generate a motor rotation speed command for adjusting the rotation speed of the motor 35. In this way, variation of the actual pressure in the pressure chamber 45 is suppressed, to thereby suppress variation of the supply pressure of hydrogen gas.

The pump PID controller 86 outputs, based on the difference between the target flow rate and the actual flow rate of hydrogen gas received from the engine control unit 70, the PID command value for the rotation speed of the motor 35 of the liquid hydrogen pump 32. Because the PID command value is calculated based on the same value for the difference between the target flow rate and the actual flow rate of hydrogen gas that is used by the injector PID controller 76, the PID command value is in synchronism with the injector actuation command. Therefore, the PID command value can cause the liquid hydrogen pump 32 to discharge liquid hydrogen at a flow rate corresponding to the flow rate of hydrogen gas to be supplied to the hydrogen engine 10. In this way, the hydrogen gas can be generated in synchronism with the change in the flow rate of hydrogen gas consumed by the hydrogen engine 10 even when the flow rate of hydrogen gas consumed by the hydrogen engine 10 varies in accordance with changes in the opening of the accelerator 19, such that variation of the actual pressure in the pressure chamber 45 can be suppressed to thereby suppress variation of the supply pressure at which hydrogen gas is supplied to the hydrogen engine 10.

The pressure feedback controller 85 outputs the pressure feedback command value based on a difference between the target pressure stored in the memory 72 and the actual pressure in the pressure chamber 45 detected by the pressure sensor 46. The target pressure may be defined as appropriate, provided that the target pressure is higher than the supply pressure of hydrogen gas supplied to the hydrogen engine 10 and lower than an upper limit pressure of the hydrogen gas. The pressure feedback command value is a command value designed to increase the rotation speed of the motor 35 of the liquid hydrogen pump 32 in order to increase the discharge flow rate when the actual pressure in the pressure chamber becomes lower than the target pressure and decrease the rotation speed of the motor 35 of the liquid hydrogen pump 32 in order to decrease the discharge flow rate when the actual pressure in the pressure chamber 45 becomes higher than the target pressure.

The adder 87 is configured to add the PID command value and the pressure feedback command value for generating a rotation speed command for the motor 35. The addition may be simple addition of the two command values or may be weighted addition. For example, when the change in the quantity of hydrogen consumed by the hydrogen engine 10 is not noticeably great, weight of the pressure feedback command value may be set to a value greater than that of the PID command value. On the other hand, when the change in the quantity of hydrogen consumed by the hydrogen engine 10 is noticeably great, the weight of the PID command value may be increased to enhance responsiveness.

Because the rotation speed command applied to the motor 35 is generated, as described above, by adding the PID command value to the pressure feedback command value, and the discharge flow rate of the liquid hydrogen pump 32 is regulated by adjusting the rotation speed of the motor 35 of the liquid hydrogen pump 32 in accordance with the rotation speed command, the variation of the actual pressure in the pressure chamber 45 can be suppressed, to thereby reduce the variation of the supply pressure of hydrogen gas.

In the above explanation, it is described that the pump control unit 80 is configured to receive from the engine control unit 70 the input of the target flow rate of hydrogen gas and the actual flow rate of hydrogen gas detected by the flow rate sensor 22. The pump control unit 80 is not limited to the above-described configuration, and may be configured to directly receive from the flow rate sensor 22 a signal indicative of the actual flow rate of hydrogen gas without intervention of the engine control unit 70.

Further, in the above explanation, the pump control unit 80 is equipped with the pump PID controller 86 configured to output the PID command value for the rotation speed of the motor 35 of the liquid hydrogen pump 32 based on the difference between the target flow rate and the actual flow rate of hydrogen gas which are input from the engine control unit 70, although the pump control unit 80 is not limited to such a configuration. For example, the pump control unit 80 may be configured to calculate, based on a single input of either the target flow rate of hydrogen gas or the actual flow rate of hydrogen gas received from the engine control unit 70, a proportional command value according to proportional control as in the case of a hydrogen supplying device 130 shown in FIGS. 3 and 4, and generate the rotation speed command for the motor 35 using the proportional command value and the pressure feedback command value.

Figure 3:
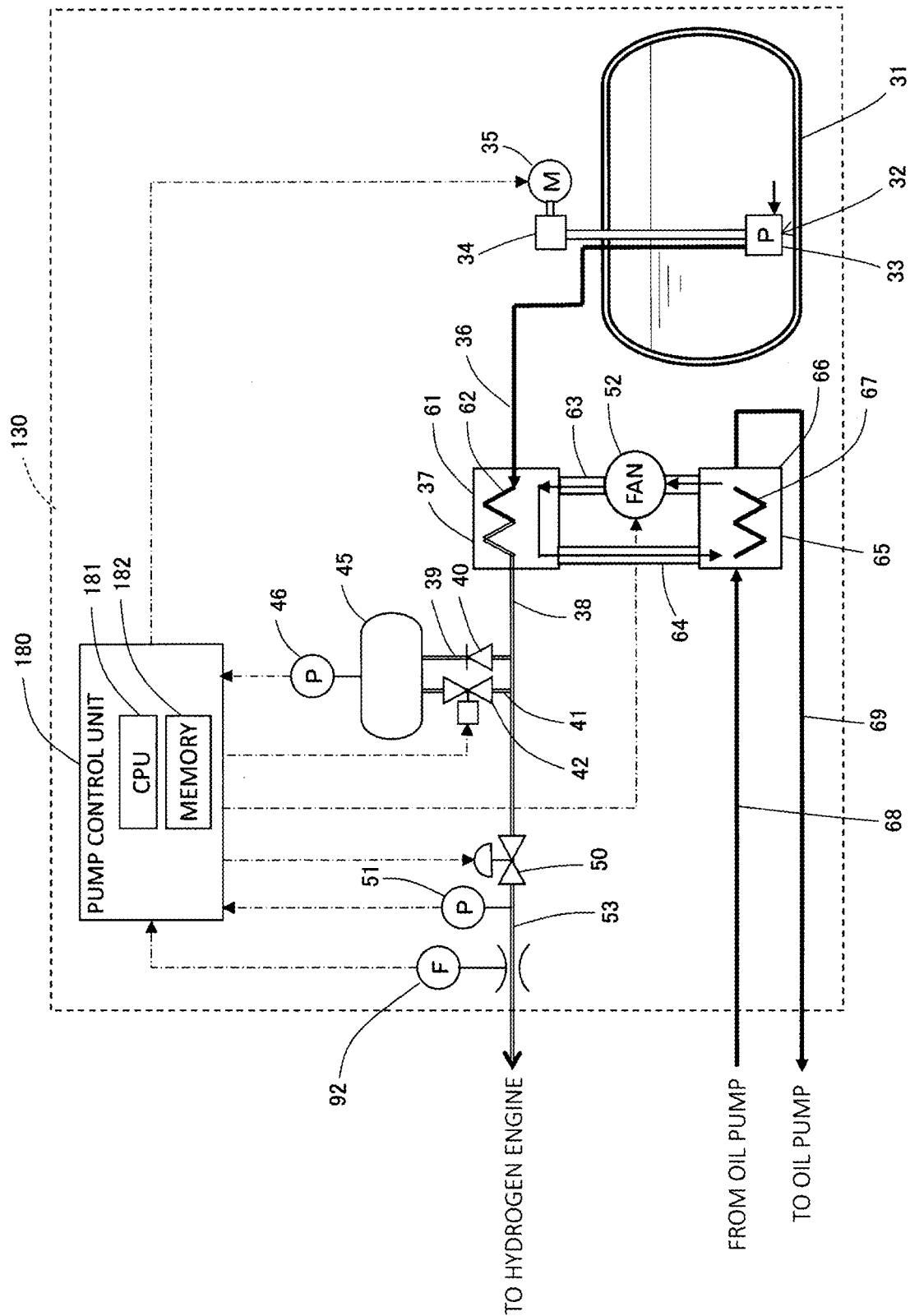
FIG. 3 is a system diagram showing a configuration of a hydrogen supplying device according to an embodiment.
Figure 4:
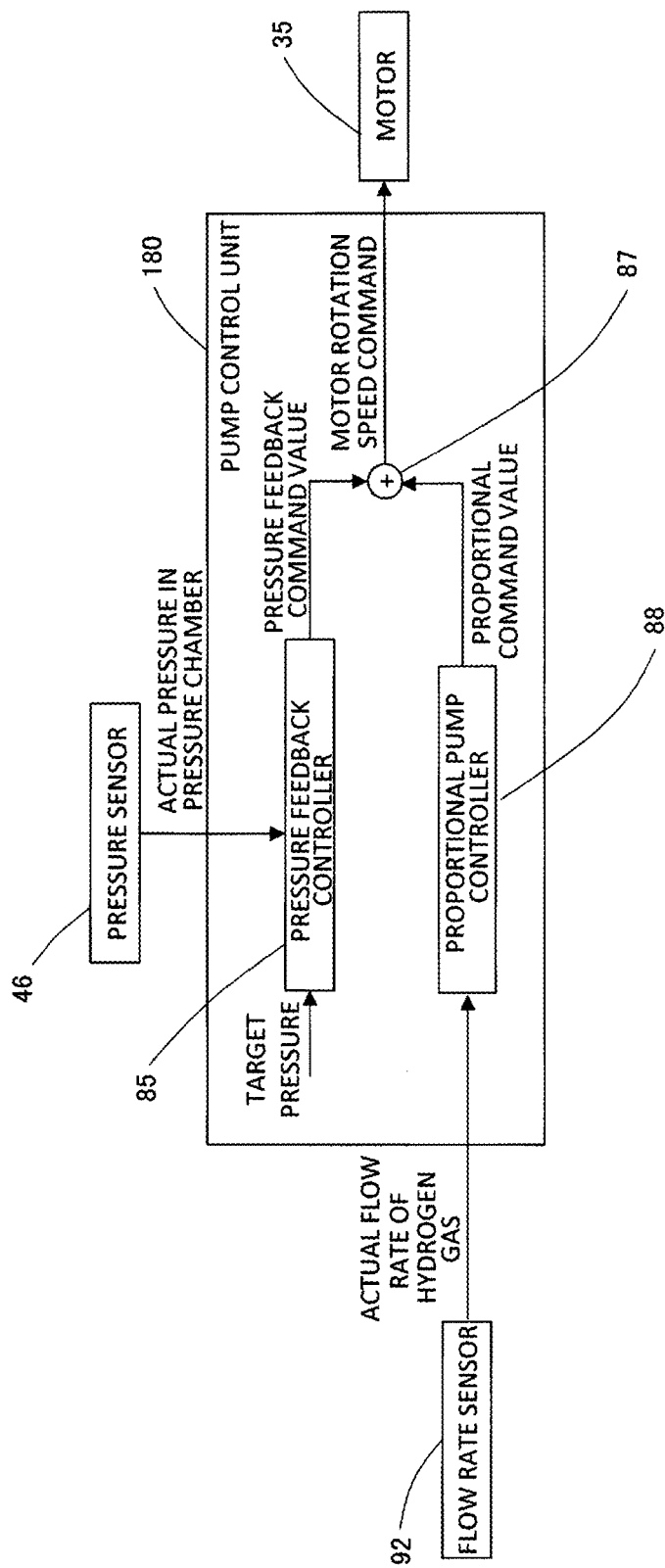
FIG. 4 is a functional block diagram showing a pump control unit in the hydrogen supplying device illustrated in FIG. 3.

Referring next to FIGS. 3 and 4, the hydrogen supplying device 130 which differs in structure from the above-described hydrogen supplying device 30 is explained. The same components as those of the hydrogen supplying device 30 are designated by the same reference numerals as those of the hydrogen supplying device 30, and description related to those components will not be repeated.

As shown in FIG. 3, the hydrogen supplying device 130 includes a flow rate sensor 92 which is attached to the hydrogen gas supplying pipe 53 and configured to detect the flow rate of hydrogen gas to be supplied to the hydrogen engine 10. A signal indicative of the flow rate detected by the flow rate sensor 92 is input to a pump control unit 180. The pump control unit 180 is a computer incorporating a CPU 181 being a processor configured to perform information processing and a memory 182 for storing a program and control data. As distinct from the pump control unit 80 in the hydrogen supplying device 30 according to the previous embodiment, the pump control unit 180 is not connected to the engine control unit 70.

As shown in FIG. 4, the pump control unit 180 includes a proportional pump controller 88 rather than the PID controller 86 of the previously described pump control unit 80. The proportional pump controller 88 multiplies the actual flow rate of hydrogen gas detected by the flow rate sensor 92 by a constant of proportionality to calculate the proportional command value. Using this proportional command value, the hydrogen supplying device 130 is able to generate hydrogen gas in a manner linked to the change in the flow rate of hydrogen gas consumed by the hydrogen engine 10, and is thus able to suppress variation in the actual pressure in the pressure chamber 45 to thereby suppress the variation of the supply pressure of the hydrogen gas, as in the case of the previously explained hydrogen supplying device 30.

The invention claimed is:

1. A hydrogen supplying device, comprising:
   a liquid hydrogen pump configured to pressurize liquid hydrogen stored in a liquid hydrogen tank;
   an evaporator configured to convert the liquid hydrogen discharged from the liquid hydrogen pump into hydrogen gas;
   a pressure chamber configured to be filled with the hydrogen gas flowing therein from the evaporator and to supply the filled hydrogen gas to a hydrogen engine;
   a pump control unit configured to adjust a discharge flow rate of the liquid hydrogen pump, and configured to adjust, based on both a flow rate of hydrogen to be supplied to the hydrogen engine and an actual pressure in the pressure chamber, the discharge flow rate of the liquid hydrogen pump so as to match the actual pressure in the pressure chamber with a target pressure; and
   a pressure sensor configured to detect the actual pressure in the pressure chamber,
   wherein the pump control unit is further configured to
      receive an input from an engine control unit configured to adjust the flow rate of hydrogen to be supplied to the hydrogen engine, the input including one or both of a target flow rate of the hydrogen gas to be supplied to the hydrogen engine and an actual flow rate of hydrogen gas that is detected by a flow rate sensor configured to detect the actual flow rate of the hydrogen gas to be supplied to the hydrogen engine, and adjust the discharge flow rate of the liquid hydrogen pump based on the one or both of the target flow rate of hydrogen gas and the actual flow rate of the hydrogen gas and also based on the actual pressure in the pressure chamber detected by the pressure sensor.

2. The hydrogen supplying device according to claim 1, wherein the pressure chamber has a capacity equivalent to 30 to 60 seconds worth of hydrogen consumed at a maximum flow rate by the hydrogen engine.

3. The hydrogen supplying device according to claim 1, wherein:
the evaporator is a heat exchanger which exchanges heat between liquid hydrogen and helium; and
the hydrogen supplying device further comprises a warmer configured to exchange heat between the helium and a cooling oil for the hydrogen engine, for warming the helium.

4. A hydrogen supplying device comprising:
a liquid hydrogen pump configured to pressurize liquid hydrogen stored in a liquid hydrogen tank;
an evaporator configured to convert the liquid hydrogen discharged from the liquid hydrogen pump into hydrogen gas;
a pressure chamber configured to be filled with the hydrogen gas flowing therein from the evaporator and to supply the filled hydrogen gas to a hydrogen engine;
a pump control unit configured to adjust a discharge flow rate of the liquid hydrogen pump, and configured to adjust, based on both a flow rate of hydrogen to be supplied to the hydrogen engine and an actual pressure in the pressure chamber, the discharge flow rate of the liquid hydrogen pump so as to match the actual pressure in the pressure chamber with a target pressure;
a pressure sensor configured to detect the actual pressure in the pressure chamber; and
a flow rate sensor configured to detect an actual flow rate of hydrogen gas to be supplied to the hydrogen engine, wherein
the pump control unit is further configured to adjust the discharge flow rate of the liquid hydrogen pump, based on both the actual flow rate of hydrogen gas detected by the flow rate sensor and the actual pressure in the pressure chamber detected by the pressure sensor.

5. The hydrogen supplying device according to claim 4, wherein the pressure chamber has a capacity equivalent to 30 to 60 seconds worth of hydrogen consumed at a maximum flow rate by the hydrogen engine.

6. The hydrogen supplying device according to claim 4, wherein:
the evaporator is a heat exchanger which exchanges heat between liquid hydrogen and helium; and
the hydrogen supplying device further comprises a warmer configured to exchange heat between the helium and a cooling oil for the hydrogen engine, for warming the helium.

7. A hydrogen engine vehicle, comprising:
a hydrogen engine for vehicle driving; and
a hydrogen supplying device configured to supply the hydrogen engine with hydrogen gas,
wherein the hydrogen supplying device comprises
a liquid hydrogen pump configured to increase a pressure of liquid hydrogen stored in a liquid hydrogen tank;
an evaporator configured to convert the liquid hydrogen discharged from the liquid hydrogen pump into the hydrogen gas;
a pressure chamber configured to be filled with the hydrogen gas flowing therein from the evaporator and to supply the filled hydrogen gas to the hydrogen engine; and
a pump control unit configured to adjust a discharge flow rate of the liquid hydrogen pump, and configured to adjust, based on both a flow rate of hydrogen to be supplied to the hydrogen engine and an actual pressure in the pressure chamber, the discharge flow rate of the liquid hydrogen pump so as to match the actual pressure in the pressure chamber with a target pressure,
wherein the hydrogen engine vehicle further comprises
an engine control unit configured to adjust the flow rate of hydrogen to be supplied to the hydrogen engine; and
a flow rate sensor configured to detect an actual flow rate of hydrogen gas to be supplied to the hydrogen engine,
wherein the hydrogen supplying device further comprises a pressure sensor configured to detect the actual pressure in the hydrogen chamber, and
wherein the pump control unit is connected to the engine control unit, and is configured to
receive an input from the engine control unit, the input including one or both of a target flow rate of hydrogen gas to be supplied to the hydrogen engine and the actual flow rate of the hydrogen gas, and
adjust the discharge flow rate of the liquid hydrogen pump based on the one or both of the target flow rate and the actual flow rate of the hydrogen gas and also based on the actual pressure in the pressure chamber detected by the pressure sensor.

8. The hydrogen engine vehicle according to claim 7, further comprising:
an accelerator, and
an opening sensor configured to detect an opening of the accelerator, wherein
the engine control unit is configured to calculate, based on the opening of the accelerator detected by the opening sensor, the target flow rate of the hydrogen gas to be supplied to the hydrogen engine, and to output the calculated target flow rate to the pump control unit.

\* \* \* \* \*